Sept. 22, 1970  ICHIRO TAKAGAKI  3,529,400
PACKAGING APPARATUS

Filed May 20, 1968  5 Sheets-Sheet 1

INVENTOR.
I. TAKAGAKI
BY Glesond, Downing &
Lutred
ATTORNEYS

United States Patent Office 3,529,400
Patented Sept. 22, 1970

3,529,400
PACKAGING APPARATUS
Ichiro Takagaki, Settsu, Japan, assignor to Mitsubishi
Jukogyo Kabushiki Kaisha
Filed May 20, 1968, Ser. No. 730,365
Int. Cl. B65b 1/02, 9/10
U.S. Cl. 53—183                                    2 Claims

ABSTRACT OF THE DISCLOSURE

A packaging method and an apparatus therefor comprising means disposed at a position in the transportation path of a flatly folded film tube for providing on one side of said film tube slits or notches at right angles with respect to the longitudinal direction of said film tube and spaced apart from each other by a predetermined distance; means for fusion-welding a portion in the proximity of the preceding slit or notch of said film tube after said film tube has been advanced a predetermined distance and cutting off said film tube to provide the mouth opening of a preceding bag and the bottom of a bag next to said preceding bag; and means for opening the slit or notch of said film tube next to said preceding slit or notch and filling a charge of product or the like into said film tube.

BRIEF SUMMARY OF THE INVENTION

The present invention relates to a method and an apparatus for automatically continuously packing into flatly folded plastic film tube a charge of an article, product or the like such as solid substance, frozen fish, powder and others. In the conventional method and apparatus of the type described, from the lower side of a charging hopper provided with a chute; a film tube is raised as high as possible toward the chute and is fitted over the chute so that a charge from the chute is filled into the film tube. Thereafter the film tube is fusion-welded and cut off on the lower side of the chute. In this case, the length of the chute is limited so that a long tube cannot be used, and, furthermore, warping or wrinkling is produced in the tube since the film tube must be raised.

Also known is the method in which a long tube is supplied from the lower side of the charging hopper so that the upper peripheral edge portion of the tube is substantially supported by the lower end of the hopper while the lower end portion of the tube is sealed so as to form the bottom of a bag and cut off; thereafter a charge is filled into the bag; and then the upper end portion of the bag is released from the lower end of the hopper so as to seal the mouth portion of the bag. In this case, means for clamping the film tube to the hopper and a member or means for expanding the tube into the form of a cylinder when a charge is filled into the tube from the hopper must be provided so that the construction of a packaging machine becomes complicated and the efficiency of packaging operation is not satisfactory.

In a cyclo-rotary method or system in which a bag is formed from a long tube and each of the thus formed bags are transferred on a rotary table so that the mouth of a bag is opened, a charge is filled into the bag and the mouth is sealed while the rotary table is rotated, the efficiency can be increased as compared with the above described methods, but the packaging machine must be made in large size and its construction becomes very much complicated. Therefore, the packaging machine of this type requires much installation space and the cost is high. In view of the above, one of the objects of the present invention is to provide a method and an apparatus for filling a charge into a tube, comprising the steps of providing slits or notches on one side of a continuously supplied long, flatly folded tube, at right angles with respect to the longitudinal direction of said tube and spaced apart from each other by a predetermined distance; fusion-welding the portion in the proximity of the preceding slit or notch of said tube after said tube has been advanced a predetermined distance; opening the slit or notch next to said preceding slit or notch of the tube; and filling a charge into said tube from said opened slit or notch.

According to the present invention, since the flatly folded film tube is provided at one side thereof slits or notches which are sequentially opened so that a charge is filled through these opened slits or notches into the tube, thereby effecting the packaging operation, the above described and other defects of the conventional packaging methods and apparatus can be eliminated, and at the same time the charge filling and packaging operations can be efficiently continuously effected without manual labor.

Another object of the present invention is to provide a method and an apparatus for packing a charge into a tube characterized in that compressed air is blown against said slit or notch portion of the film tube provided while the film tube is transported so as to facilitate the opening of said slit or notch, thereby permitting the efficient charge filling and packaging operations.

According to the present invention, a long length of film tube may be used because while the film is being transported, the film is provided with slits or notches on one side of the film tube at right angles with respect to the longitudinal direction of said tube and spaced apart from each other by a predetermined distance; this slit or notch provided tube is intermittently supplied so as to fusion-weld the portion in the proximity of the preceding slit or notch, thereby providing a mouth of the preceding bag; and after the bottom of the bag next to said preceding bag has been sealed, the slit or notch next to said preceding slit or notch is opened so as to fill into the tube bag a charge from the chute. It will be, therefore, clearly seen that according to the present invention highly efficient charge filling and packaging operations can be effected without undesired waste time of lifting a film tube up to a hopper whenever a charge is filled into the tube and of expanding the mouth of a tube so as to fit over the hopper.

DETAILED DESCRIPTION OF THE INVENTION

Figure 1:
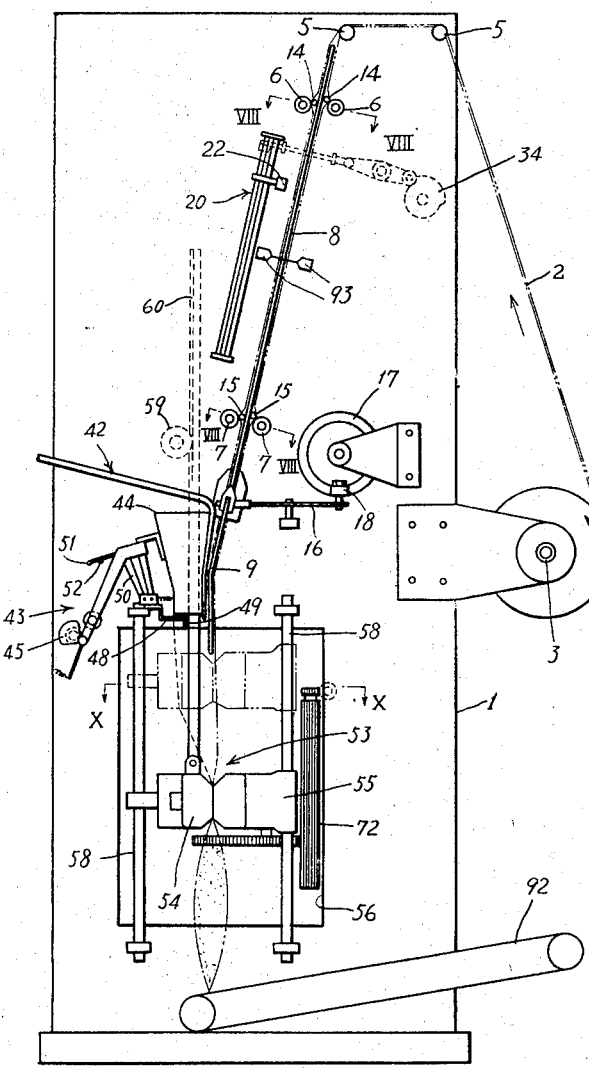
FIG. 1 is a diagrammatic front view of an embodiment of the present invention.

A method and an apparatus for filling into a synthetic resin film tube (which will be referred to as "tube" hereinafter for brevity) a product, for example, in the form of powder, granular or the like such as sugar, powder, wheat and the like and packaging the same according to the present invention will be described in detail with reference to an embodiment thereof illustrated by way of a nonrestrictive example. Reference numeral 1 designates a machine frame. A length of tube 2 is supplied from a reel 4 rotatably carried by a shaft 3 which in turn is journalled at one side of the machine frame 1. Reference numerals 5 and 5 designate guide rollers for tube disposed rotatably at one end portion of the machine frame 1; and 6 and 6, 7 and 7 are two pairs of rollers disposed in longitudinally spaced apart relation, each pair of rollers being disposed in opposed relation and adapted to be intermittently driven and controlled so as to intermittently feed downwardly the tube 2 supplied from the reel 4 through the guide rollers 5 and 5 as will be described in detail hereinafter.

Reference numeral 8 designates a guide plate which pivotably carries at 10 and 10 a pair of tube tension elements 9 and 9. The guide plate 8 is adapted to be inserted into the tube 2, and is carried by two pairs of tube feed rollers 6 and 6; 7 and 7 through two pairs of small diameter rollers 14 and 14; and 15 and 15 disposed adjacent to the rollers 6 and 6; and 7 and 7 respectively.

A guide member is composed by the guide plate 8 together with the small diameter rollers 14 and 14; and 15 and 15, two pairs of tube feed rollers 6 and 6; and 7 and 7 and the tube tension elements 9 and 9. The guide plate 8 is shown as being formed of a plate, but it may be a frame member in the form of "#" and the tube tension elements 9 and 9 are not necessarily required.

Figure 2:
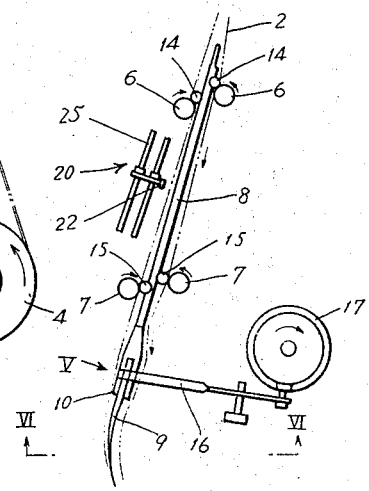
FIG. 2 is a front view illustrating one example of a guide plate slit mechanism and a tube tension mechanism.
Figure 5:
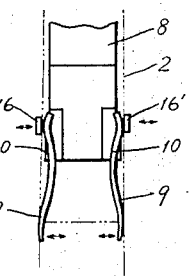
FIG. 5 is a side view looking in the direction of the arrow V in FIG. 2.

Reference numeral 20 designates generally a slit mechanism whose construction will be described in detail hereinafter and is disposed on the left side relative to the tube transportation path as best shown in FIGS. 1 and 2.

Figure 3:
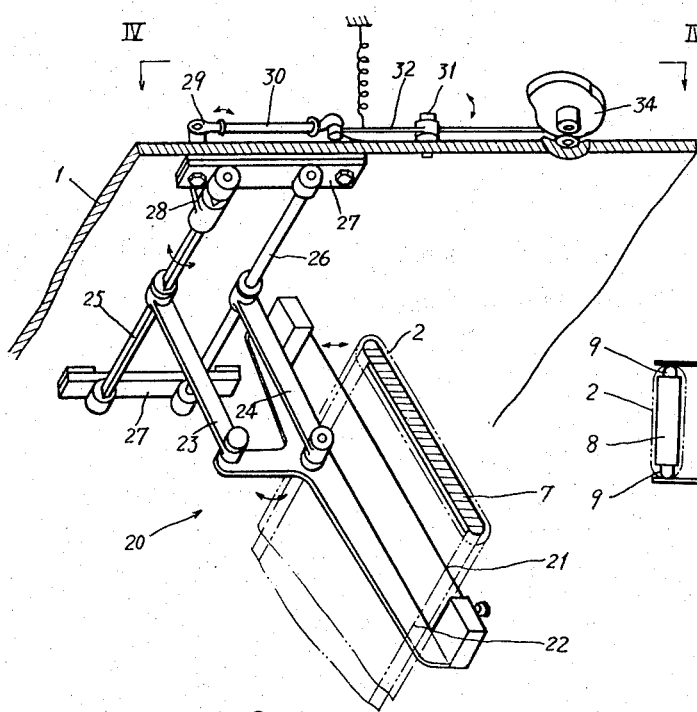
FIG. 3 is a perspective view, on a magnified scale, of the slit mechanism shown in FIG. 2.
Figure 6:
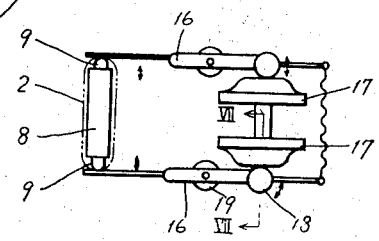
FIG. 6 is a view looking in the direction of the arrows VI—VI of FIG. 2.
Figure 4:
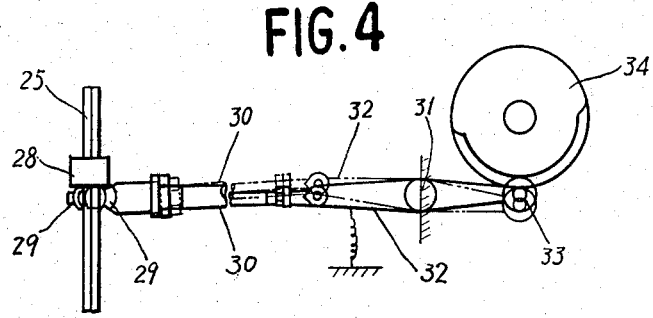
FIG. 4 is a plan view looking in the direction of the arrows IV—IV in FIG. 3.
Figure 12:
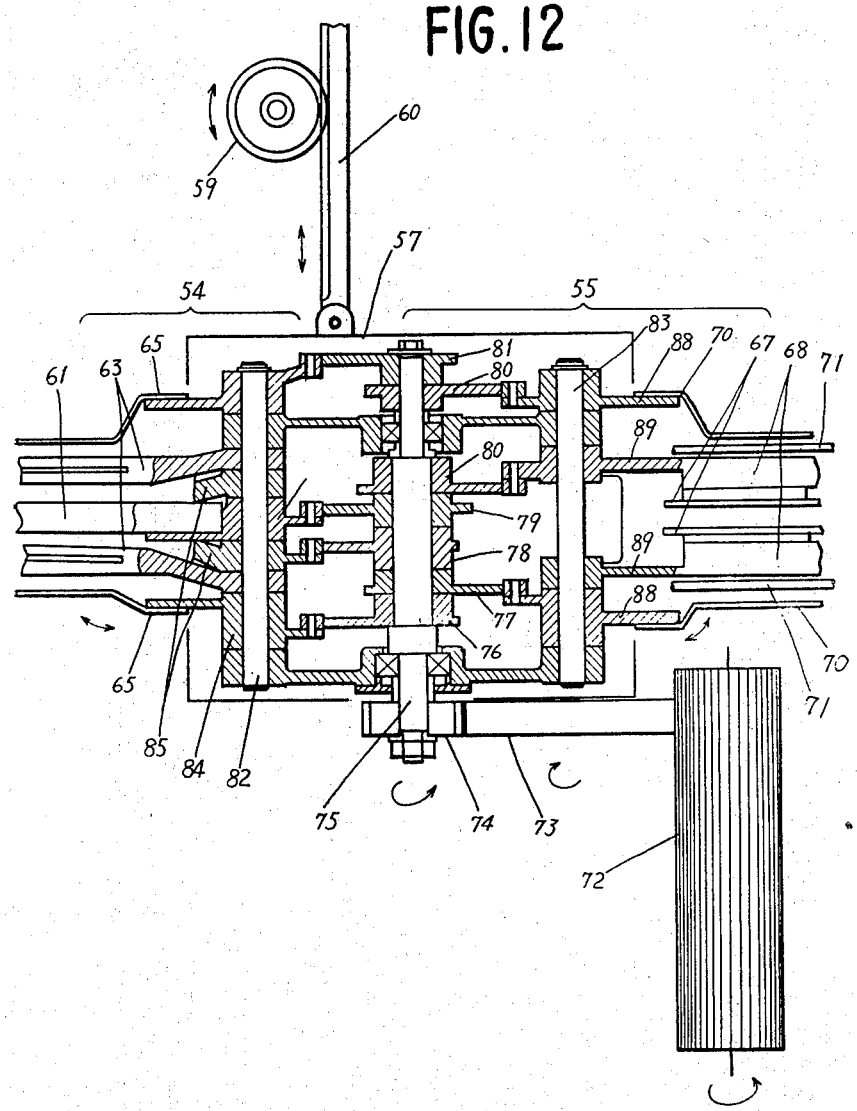
FIG. 12 is a view looking in the direction of the arrow VII of FIG. 10 illustrating a heating block and a holding block in their full open positions.

Reference numeral 21 designates a heater carried by a heater frame 22 for heating and cutting off the tube 2. The heater 21 is adapted to provide a slit or cut in the tube 2 at a right angle relative to the longitudinal direction of the tube 2 whenever the heater 21 is made in contact with one side of the tube 2 as described in more detail hereinafter, the slits or notches provided in the tube 2 being spaced apart from each other by a predetermined distance in the longitudinal direction of the tube 2. The heater frame 22 is supported by means of a pair of arms 23 and 24 whose base portions are carried by rotary shafts 25 and 26 respectively. These shafts 25 and 26 are rotatably carried by brackets 27 and 27 respectively which in turn are securely fixed to the machine frame 1. A rocking arm 28 is carried by the rotary shaft 25 and is extending inwardly of the frame 1 through a slit provided in the frame 1 and is coupled to a lever 30 through a ball joint 29. The lever 30 is coupled to a lever 32 which is rotated about the fulcrum point 31. A cam follower 33 is carried by the lever 32 and engages with the cam 34 as best shown in FIG. 4. The heater 21 which is one of the components to compose the slit mechanism 20 is moved in the direction of the double-pointed arrow in FIG. 3 through the lever 32, the lever 30, the arm 28, the shaft 25 and the levers 23 and 24 from the cam 37 which is driven in synchronism with the feed of the tube 2. The heater 21 is electrically heated. When the heater 21 is lowered so as to contact with the tube 2, the heater 21 fuses one portion of the tube 2, thus leaving a slit or notch. Thereafter, the tube 2 provided with slits or notches as described above is coated with a rubber or synthetic resin and is transferred intermittently downwardly by means of the feed rollers 6 and 6; and 7 and 7.

Figure 8:
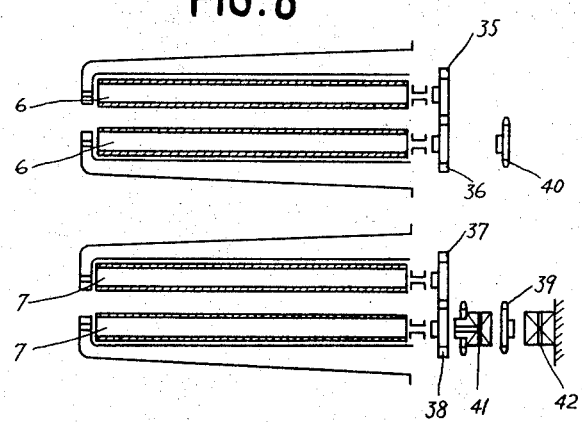
FIG. 8 is a sectional view taken along the line VIII—VIII of FIG. 1 illustrating the mode of operation of film tube feed rollers.
Figure 7:
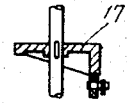
FIG. 7 is a sectional view taken substantially along the line VII—VII of FIG. 6.
Figure 9:
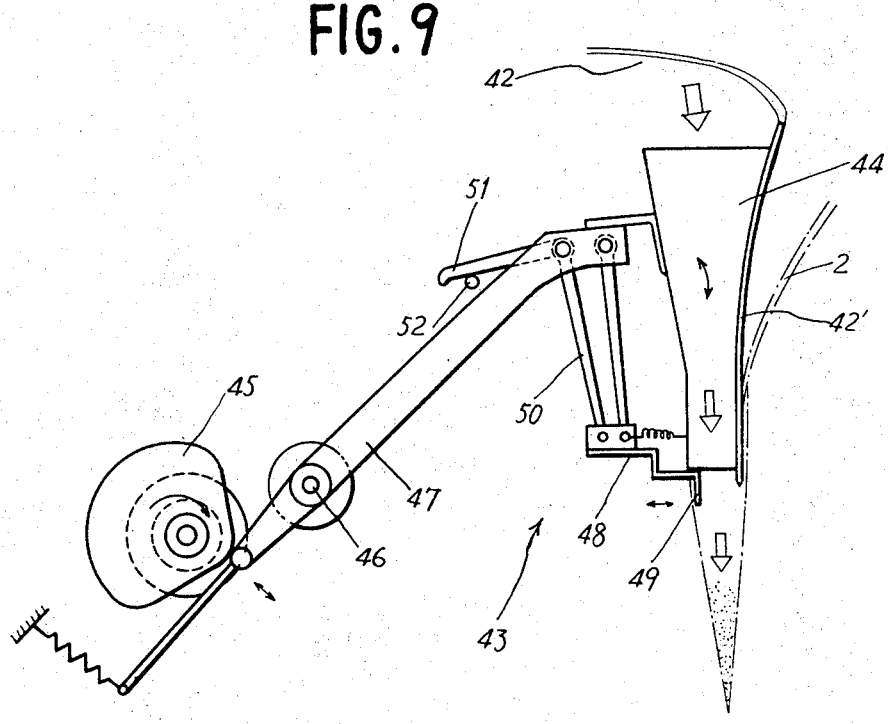
FIG. 9 is a front view illustrating a charge filling mechanism in the state in which a charge is being filled into a tube.

As best shown in FIG. 8, the rollers 6 and 6; 7 and 7 are provided with toothed wheels 35, 36, 37 and 38 respectively. One of the rollers 7 is drivingly coupled to a prime mover through a chain sprocket 39 which is disposed coaxially of the roller 7 so that the driving force from the prime mover is transmitted through the sprocket wheel 39 to the toothed wheels 38 and 37 and then to the rollers 7 and 7. In the similar manner the rollers 6 and 6 are rotated through the intermeshing toothed wheels 35 and 36 which in turn is rotated by means of a sprocket wheel 40 disposed coaxially of the toothed wheel 36. These feed rollers 6 and 6; and 7 and 7 are driven intermittently by means of a limit switch (not shown) which energizes or de-energizes an electromagnetic clutch 41 and an electromagnetic brake 42 which are disposed coaxially of the sprocket wheel 39, so that the tube 2 is intermittently transported downwardly in the figure. When the tube 2 is transported downwardly by means of the feed rollers 6 and 6; and 7 and 7 as described above, the tension elements 9 and 9 are actuated by levers 16 and 16 which in turn are connected to cams 17 and 17 for rocking motion so that the downwardly moving tube 2 is exerted with the tension from the tension elements 9 and 9, whereby the tube 2 is made into a flat form and then moved to the next stages of filling and fusion-welding and cutting off. When the tube 2 provided with suitably spaced apart slits or notches in the aforementioned stage is further advanced a predetermined length downwardly of the feed rollers 7 and 7, the opening mechanism, the filling mechanism and the fusion-welding and cutting-off or separating mechanism all of which are located downwardly of the feed rollers 7 and 7 are actuated. Now with reference to FIGS. 1 and 9, the slit opening mechanism 42 and the filling mechanism 43 will be described in more detail hereinafter.

A chute 44 is actuated responsive to rotation of a cam 45 which makes one rotation per cycle by means of a prime mover, and makes a rocking motion by means of a lever 47 which tilts about a pivot 46.

The lowermost end of the chute 44 is a filling postion of a charge of product to be filled into a tube. At the bottom of the chute 44 is provided with a chute bottom cover 48 which is actuated responsive to the engagement of a stopper 52 with a lever 51 secured fixedly to a lever 50 upon the downward movement of the chute 44, so that the bottom of the chute 44 is opened.

When the chute 44 is raised, the engagement of the lever 51 with the stopper 52 is released so that the bottom cover 48 closes the bottom of the chute 44.

When the preceding slit of the tube 2 is located in the proximity of the lowered position of the chute 44, the cam 45 is actuated so that the chute 44 is lowered as described hereinbefore. In this case, from the lower open end of a compressed air tube 42, which is also a component of the tube opening mechanism 42 and is disposed at the back portion of the chute 44, is ejected air into the tube 2 so that the slit or notch of the tube 2 is widely opened.

Into the thus widely opened slit or notch portion of the tube 2 is inserted an opening element 49 fixedly secured to the shoot bottom cover 48 when the chute 44 is lowered. When the chute 44 is further lowered, the lever 51 engages with the stopper 52 so that the chute bottom cover 48 is retracted toward the left in the figure, whereby the slit or notch portion of the tube 2 is widened. Thereafter, when the bottom of the chute is fully opened, the injection of the compressed air through the pipe 42 is stopped and a charge is filled into the tube 2.

On the other hand, prior to the tube 2 being filled with a charge, the fusion-welding and cutting-off mechanism 53 which will be described in more detail hereinafter is actuated so as to hold the portion of the tube 2 in the proximity of the next slit or notch portion of the tube 2, to fusion-weld and cut off that portion, whereby the bottom of a next bag and the mouth opening of the preceding bag are formed. In the embodiment shown in the drawings, when the slit or notch portion of the tube 2 is widely opened, the compressed air and the opening element 49 are used as the opening mechanism. However, it is not necessary to inject into the tube 2 the compressed air. The slit or notch portion of the tube may be widely opened only by means of the opening element 49 fixedly secured to the lower end of the lever 48 when the downward movement of the opening element 49 is cooperated suitably with the downward movement of the tube 2.

Figure 10:
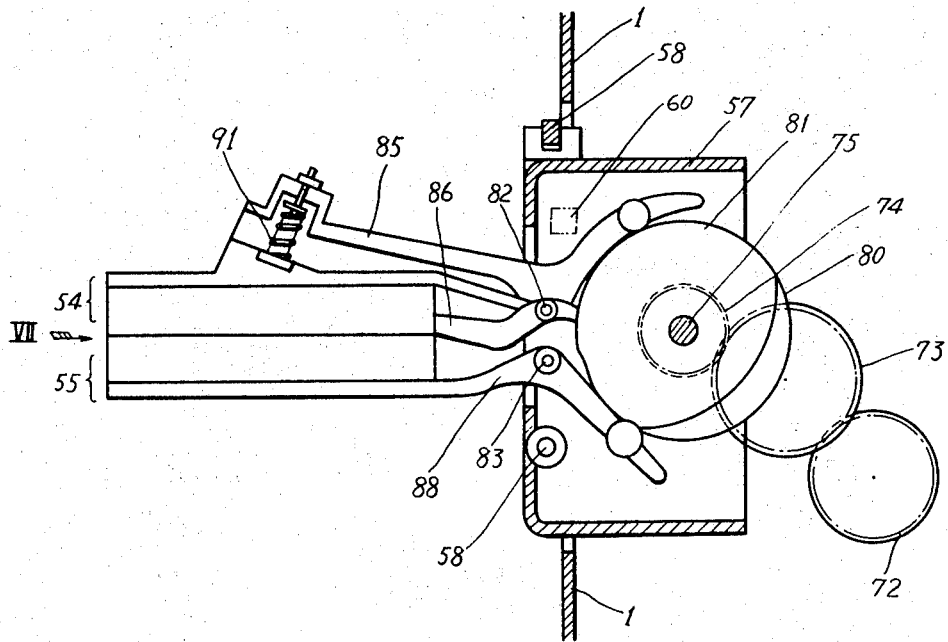
FIG. 10 is a plan view showing fusion-welding and cutting-off mechanism.

Next with reference to FIGS. 1 and 10, the fusion-welding and cutting-off mechanism generally designated by 53 will be described in more detail hereinafter.

The fusion-welding and cutting-off mechanism generally designated by 53 is comprising a heat plate block 54 and a holding block 55, and is disposed in an opening 56 provided in the lower portion of the frame 1. The blocks 54 and 55 are mounted on a frame 57 in such a manner that they can be moved toward and away from each other as described hereinafter. The frame 57 is suspended by means of a rack 60 which is in mesh with a pinion 59 disposed within the frame 1 so that the frame 57 can move vertically slidably along supporting members 58 and 58 juxtaposed on the front side of the frame 1, a distance corresponding to the length of a bag into which is filled a charge.

Figure 11:
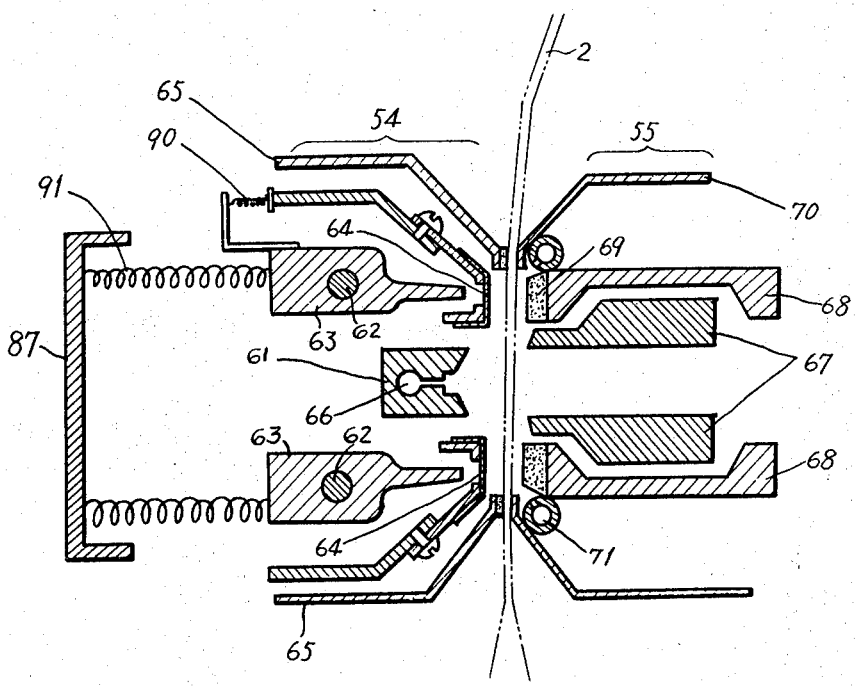
FIG. 11 is an exploded view, at an enlarged scale, of the main components of the mechanism shown in FIG. 10.
Figure 13:
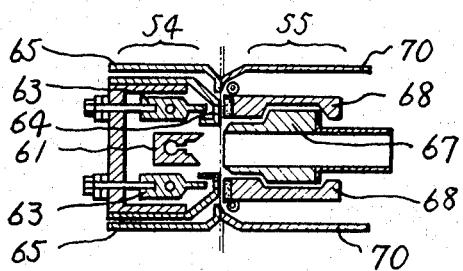
FIGS. 13 to 16 are explanatory views illustrating the processes of welding and cutting the film tube.

The heater plate block 54 is best shown in FIG. 11 and is comprising a cutter 61 located at the center of the block 54, a pair of heater plates 63 disposed on both sides of the cutter 61 and each having a heater 62 therein, a pair of tube pressing elements 64 made of heat resisting, non-adhesive synthetic resin film such as polytetrafluoroethylene or heat-resistive cloth impregnated with polytetrafluoroethylene, said tube pressing element 64 being adapted to contact with the tube 2 prior to the advance of the heater plate 63, a pair of tube holding plates disposed outwardly of the tube pressing elements 64, and levers 84, 85 and 86 which respectively carry the above described components.

The holding block 55 is a member which is disposed in opposition to the heater plate block 54 for serving to hold in position the tube 2 while the tube 2 is fusion-welded and cut off. The holding block 55 is comprising a pair of vertically spaced apart cutter receiving plates 67, a pair of heater plate receiving plates 68 disposed outwardly of the receiving plates 67 and each having at its end near the tube 2 a heat-resisting rubber 69 fixed securely thereto, a pair of holding elements 70 disposed outwardly of the heater plate receiving plates 68, levers 88 and 89 adapted to carry the above described components and a pair of air tubes 71 each disposed between the holding element 70 and the heater plate receiving plate 68 for intermittently blowing out the air so as to prevent the overheat of the components other than the heater plates 63. Next the mode of the operation of the blocks 54 and 55 which move toward and away from each other will be described hereinafter.

The rotary motion of the prime mover (not shown) is transmitted through a long toothed wheel 72, a toothed wheel 73 in mesh with the wheel 72, and a toothed wheel 74 in mesh with the wheel 73 to a cam shaft 75 upon which is mounted the toothed wheel 74 and which is journalled by the frame 57. The cam shaft 75 carries cams 76, 77, 78, 79, 80 and 81. These cams 76 to 81 causes to rock or tilt the levers 84 to 89 about the shaft 82 and 83 so that the holding plates 65 and 70, the pressing elements 64, the heater plate receiving plates 68, the heater plates 63, the cutter 61 and the cutter receiving plates 67 all of which are carried by the levers 84 to 89 are all actuated in predetermined timing relations, whereby the heater plate block 54 and the holding block 55 are moved toward each other and moved away from each other in the order shown in FIGS. 13 to 16.

As shown in FIG. 11, the pressing elements 64 are mounted on the heater plates 63 by means of springs 90, and are caused to rock or tilt by the rotation of the cam 78 prior to the motion of the heater plates 63 so that the pressing elements 64 are made in contact with the tube 2 prior to the advance of the heater plates 63, whereby the tube 2 is prevented from being directly in contact with the heater plates 63, thereby permitting to give a better appearance of the fusion-welded portion of the tube 2 and further facilitating the separation of the tube 2 from the heater plates 63 after the fusion-welding operation.

The springs 91 serve to adjust the pressing force of the heater plates 63, and are loaded between the heater plates 63 and the supporting plates 87 which rock or tilt together with levers 85 and 86 which in turn rock or tilt by the rotation of the cam 78.

In the cutter 61, there is provided a slit 66 for ejecting compressed air which is in communication with a compressed air source, whereby one portion af the tube which is cut off by the cooperative action of the cutter and the upper and lower edges of the cutter receiving plates 67 after the fusion-welding operation can be blown off. The heater plates 63 house therein heaters 62 and are rotatably carried by the shaft 82 so that the heater plates 63 are caused to rotate or tilt as the lever 85 and the supporting plate 87 are moved.

The mode of operation of the fusion-welding and cutting-off mechanism constructed as described above will be described hereinafter with reference to FIGS. 13 to 16.

The tube 2 supplied from the reel 4 is directed downwardly in the figures by means of the guide rollers 5 and 5; the feed rollers 6 and 6; and 7 and 7, and the guide plate 8. While the tube 2 is traveling downwardly as described above, the slits or notches are provided in the tube in predetermined spaced apart relation from each other. Thereafter, the tube 2 is guided by the guide plate 8 and a pair of tension elements 9 and 9 pivotably carried by the guide plate 8 so that the tube 2 is directed further downwardly in the flat form. When the preceding slit or notch of the tube 2 reaches the fusion-welding and cutting-off mechanism 53 whose position shown by the chain line in FIG. 1, the transportation of the tube 2 is stopped.

When the tube 2 is stopped, the long toothed wheel 72 drives the cam shaft 75 through the toothed wheels 73 and 74 so that the cams 76 to 81 carried by the cam shaft 75 are rotated. Then, the holding plates 65 and 65 and the holding elements 70 and 70 are made to move toward each other so that the tube 2 is held therebetween. Thereafter the pressing elements 64 and 64 and the heater plate receiving plates 68 and 68 are made to approach to each other. While the tube 2 is held between the pressing elements 64 and 64 and heater plate receiving plate 68 and 68 in contact therewith, the heater plates 63 which are heated to a temperature sufficient enough for fusion-welding the tube 2 are caused to rotate or tilt by the rotation of the cam 79 and to make a contact with the pressing elements 64 and 64, whereby the upper side portion of the preceding slit or notch portion of the tube 2 is fusion-welded.

Figure 14:
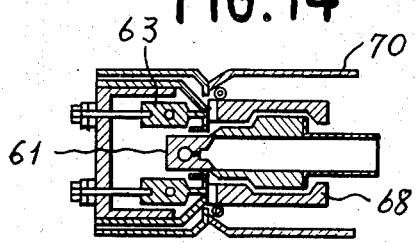

Thereafter, the cutter 61 is advanced and fitted between the cutter receiving plates 67 and 67 as shown in FIG. 14, thereby cutting off the tube 2. Next the compressed air is ejected from the slot 66 of the cutter 61, thereby blowing off thus cut-off portion of the tube 2.

Thereafter, the tube 2 is lowered again while the tube 2 is held between the heater block 54 and the holding block 55 to the position shown by the solid line in FIG. 1. The tube lowering motion is imparted by the cooperative motion of the rack 60 with the pinion 59 and guided by means of the supporting members 58 and 58.

When the tube 2 advances a predetermined length accompanied with the downward movement of the chute 44 so that the bottom of the chute 44 is inserted into the next slit or notch of the tube at the lowermost position of the chute 44, the downward movement of the tube 2 as well as the blocks 54 and 55 are stopped. As the chute 44 is lowered while the tube 2 is lowered, the compressed air is ejected upon the tube 2 from the compressed air tube 42' so that the next slit or notch of the tube 2 is widely opened.

At the same time, the opening element 49 at the end of the bottom cover 48 is also inserted into the next slit or notch of the tube 2, and by the engagement of the stopper 52 with the lever 51, the opening element 49 fully opens the next slit or notch of the tube 2 while the bottom of the chute 44 is opened. Therefore, a charge is filled into the tube. In this case, the ejection of the compressed air must be stopped prior to the filling operation.

When the charge is filled into the tube 2, the cam 45 which rotates one rotation per operation cycle is rotated so that the chute 44 is raised and the engagement of the stopper 52 with the lever 51 is released, thereby closing the bottom of the chute 44 by the cover. The chute 44 is returned to its normal position and is held there until the next operation cycle starts.

While the chute 44 is held stationary at its normal position described above, a predetermined quantity of product is charged into the chute 44.

When the charge filling operation is finished as described above and the chute 44 is returned to its normal position, then the long toothed wheel 72 and the toothed wheels 73 and 74 are rotated in the reversed directions so that the heater plate block 54 is moved away from the holding block 55. Thereafter, the pinion 59 and the rack 60 are actuated while the heater plate block 54 is held in spaced apart relation as described above so that both of the blocks 54 and 55 are lifted back to their initial positions shown by the chain lines in FIG. 1. Both of the blocks 54 and 55 are held in these initial positions until next operation cycle starts. Next the tube 2 is again advanced in the same manner as described hereinbefore by means of the feed rollers 6 and 6; and 7 and 7. And when the next slit or notch of the tube 2 reaches the above described initial positions of both of the blocks 54 and 55, the tube 2 is stopped.

When the tube 2 is advanced, it remains flat by means of the above described tube tension elements 9 and 9, so that no warping or wrinkle is produced at the portion of the tube which will become the mouth of a bag. Therefore, the mouth of the bag can be neatly fusion-welded in the next operation stage, that is the fusion-welding and cutting-off stage. When the next slit or notch of the tube 2 arrives at the fusion-welding and cutting-off mechanism in its initial position as described above, the tube is held between the holding plates 65 and 65 and the holding elements 70 and 70 and, the same time, is exerted with a light force by means of a pair of pressing elements 64 and 64 made of heating-resisting synthetic resin film and a pair of heat plate receiving plates 68 each having the heat-resisting rubber, for example a silicon rubber 69. In this state, the heater plates 63 and 63 are still spaced apart from the tube 2 and the cutter 61 is not actuated.

Figure 15:
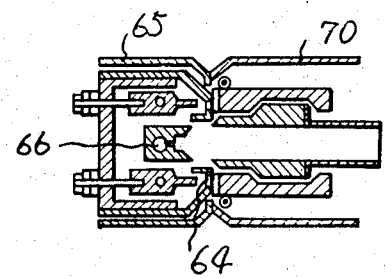
Figure 16:
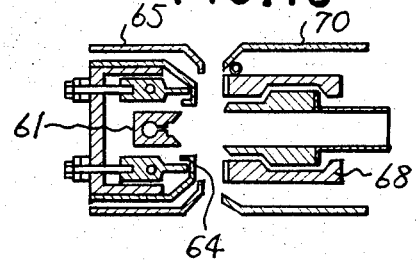

In this state, the heating plate block 54 and the holding block 55 are lowered by means of the pinion 59 and the rack 60 which are actuated responsive to the transportation of the tube 2. Therefore, the blocks 54 and 55 reach and stop at the position shown by the solid line in FIG. 1. As soon as the downward movement of the blocks 54 and 55 is stopped, the heater plates 64 and 64 are caused to contact with the heater receiving plates 68 and 68, whereby the upper and lower portions on both sides of the slit or notch of the tube 2 are fusion-welded. That is, both of the bottom of the preceding bag and the mouth of the next bag are fusion-welded. Thereafter, the cutter 61 is advanced between the cutter receiving plates 67 and 67 and the compressed air is ejected from the slit 66 of the cutter 61 so as to blow off the extra or unrequired portion of the tube 2. When the above described fusion-welding and cutting-off operation is finished, the cutter 61 and the heater plates 63 and 63 are moved away from the tube by means of the cam group from 70 to 81 and the lever group from 84 to 89 which are actuated in predetermined timing relation as shown in FIG. 15. In this case, the pressing elements 64 and 64 are not moved away from the tube 2, but hold together with the heat-resisting rubber at the ends of the receiving plates 68 and 68 the tube which has just fusion-welded. While the tube 2 is held between the pressing elements 64 and 64 and the receiving plates 68 and 68 as described above, the compressed air is ejected from the compressed air conduits 71 and 71 so that the tube 2 is cooled, thereby facilitating the separation of the tube 2 from the pressing elements 64 and 64 and heater plate receiving plates 68 and 68 without permitting the tube 2 to adhere thereto. Thereafter, as shown in FIG. 16, the holding plates 65 and 65 and 70 and 70 are moved away from each other so that the heater plate block 54 is completely spaced apart from the block 55, whereby the bag which has been filled already with a product charge is dropped upon a conveyor 92, which conveys the bag to another station.

In FIG. 1, reference numerals 93 and 93 designate photoconductive elements disposed in opposed relation on both sides of the tube 2 being transported. These photoconductive elements 93 and 93 are used in case of the tube upon which a trade mark or the like is printed in suitably spaced apart relation. When the light interrupting points (markings for detecting the length of one bag) printed on the tube in suitably spaced apart relation pass between these photoconductive elements 93 and 93, the points or markings are detected by the elements 93 and 93 so that if the printed trade mark or the like is deviated from its normal printing position, the aforementioned electromagnetic clutch is released so as to stop the feed rollers, thereby stopping the tube 2 and rejecting incorrectly printed tube portions. The invention has been described in detail with particular reference to a preferred embodiment thereof, but it will be understood that variations and modifications can be effected within the spirit and scope of the invention as described hereinabove and as defined in the appended claims.

What is claimed is:

1. A packaging apparatus comprising a guide mechanism disposed on a machine frame for intermittently guiding and transporting a flatly folded film tube downwardly, a slit mechanism slidably disposed on one side of the transportation path of said film tube for providing slits or notches at right angles with respect to the lonitudinal direction of said film tube and spaced apart from each other by a predetermined distance, a fusion-welding and cutting-off mechanism vertically movably disposed at a lower portion of said machine frame for fusion-welding the portion in the proximity of the preceding slit or notch and cutting-off into the mouth portion of a preceding bag and the bottom portion of a bag next to the preceding bag, and a charge filling mechanism slidably interposed upon said machine frame between said fusion-welding and cutting-off mechanism and said slit mechanism and adapted to be actuated and controlled when the bottom of said bag formed from said film tube is fusion-welded so as to open the next slit or notch and engage with the thus open slit or notch, thereby filling into said bag a charge of an article, product or the like, said charge filling mechanism comprising a cam adapted to rotate responsive to the advance of said film tube, a charge filling chute adapted to be actuated and controlled by said cam for slidable movement, and a chute bottom cover mounted at the bottom portion of said chute and adapted to advance for engagement with said slit or notch responsive to the movement of said chute so as to open said slit or notch and to open the bottom of said chute.

2. A packaging apparatus comprising a guide mechanism disposed on a machine frame for intermittently guiding and transporting a flatly folded film tube downwardly, a slit mechanism slidably disposed on one side of the transportation path of the film tube for providing slits or notches at right angles with respect to the longitudinal direction of the film tube and spaced apart from each other by a predetermined distance, a fusion-welding and cutting-off mechanism vertically disposed at a lower portion of the machine frame for fusion-welding the portion in the proximity of a preceding slit or notch and cutting-off into the mouth portion of a preceding bag and the bottom portion of the bag next to the preceding bag, and a charge filling mechanism slidably interposed upon the machine frame between the fusion-welding and cutting-off mechanism and the slit mechanism and adapted to be actuated and controlled when the bottom of the bag formed from the film tube is fusion-welded so as to open the next slit or notch and engage with the thus open slit or notch, thereby filling into the bag a charge of an article, product, or the like, said fusion-welding and cutting-off mechanism comprising a heater block having a cutter disposed at the center of said block heating elements, and heat-resisting holding members adapted to contact with said film tube prior to the advance of said heating elements for preventing said heating elements from contacting with said film tube; a holding block having cutter receiving plates disposed in opposition to said cutter, and plates disposed in opposition to said heating elements for receiving the same; a supporting frame for supporting both of said blocks; and a mechanism for moving both of said blocks toward and away from each other responsive to the advance of said film tube and said charge filling operation.

References Cited
UNITED STATES PATENTS 2,861,406  11/1958  Holsman et al. _____ 53—29
3,269,087  8/1966  Cloud et al. _____ 53—29 X TRAVIS S. McGEHEE, Primary Examiner E. F. DESMOND, Assistant Examiner U.S. Cl. X.R.
53—373